United States Patent [19]
Strain
[11] 3,984,386
[45] Oct. 5, 1976

[54] POLYMERIZATION OF ETHYLENICALLY UNSATURATED MONOMER WITH DIALKYL PYROCARBONATE AND HYDROGEN PEROXIDE

[75] Inventor: Franklin Strain, Barberton, Ohio
[73] Assignee: PPG Industries, Inc., Pittsburgh, Pa.

[22] Filed: May 30, 1975
[21] Appl. No.: 582,498

[52] U.S. Cl. .............................. 526/217; 260/63 R; 260/74 UA; 260/463; 260/861; 260/862; 260/DIG. 28; 526/72; 526/204; 526/229; 526/230; 526/344; 526/181
[51] Int. Cl.² ................ C08F 114/02; C08F 114/16; C08G 2/00; C08G 63/12
[58] Field of Search ................. 260/92.8 R, 92.8 W, 260/463, 63 R, 75 UA, 78.4 R, 78.4 E, 78.4 UA, 80 C, 80.3 R, 80.72, 80.23, 80.76, 80.77, 80.78, 80.8, 80.81, 85.5 N, 86.1 E, 86.1 R, 86.3, 87.5 A, 87.5 C, 87.5 E, 88.3 R, 88.1 P, 88.1 PN, 88.1 PC, 88.2 R, 88.2 B, 88.7 D, 89.3, 89.5 A, 89.5 AW; 260/89.7 R, 91.5, 92.1, 93.5 S, 93.5 W, 861, 862

[56] References Cited

UNITED STATES PATENTS

| | | | |
|---|---|---|---|
| 3,022,281 | 2/1962 | Smith | 260/92.8 W |
| 3,108,093 | 10/1963 | Pajaczkowski et al. | 260/89.5 |
| 3,326,958 | 6/1967 | Curtius et al. | 260/476 R |
| 3,420,807 | 1/1969 | Harrison et al. | 260/92.8 R |
| 3,575,945 | 4/1971 | Cantoni et al. | 260/92.8 W |
| 3,580,955 | 5/1971 | Bafford | 260/610 B |
| 3,637,633 | 1/1972 | Dixon et al. | 260/92.8 W |
| 3,821,273 | 6/1974 | D'Angelo | 260/463 |
| 3,857,828 | 12/1974 | Sanchez | 260/92.8 W |
| R25763 | 4/1965 | Marous et al. | 260/92.8 W |

*Primary Examiner*—Joseph L. Schofer
*Assistant Examiner*—Herbert J. Lilling
*Attorney, Agent, or Firm*—Irwin M. Stein

[57] ABSTRACT

Ethylenically unsaturated material susceptible to free radical polymerization, e.g., vinyl chloride monomer, is polymerized, e.g., in an aqueous medium, with an initiator system comprising, in combination, dialkyl pyrocarbonate, hydrogen peroxide, and alkaline reagent, e.g., sodium bicarbonate. The initiator system is added to the polymerization medium in amounts sufficient to polymerize the ethylenically unsaturated material.

19 Claims, No Drawings

POLYMERIZATION OF ETHYLENICALLY UNSATURATED MONOMER WITH DIALKYL PYROCARBONATE AND HYDROGEN PEROXIDE

DESCRIPTION OF THE INVENTION

The polymerization of ethylenically unsaturated materials susceptible to free-radical polymerization, e.g., unsaturated vinyl type monomers, such as vinyl chloride, with organic peroxides is well recorded in the literature and has found extensive commercial application. Among the organic peroxides suggested for use as initiators for such monomeric materials are dialkyl peroxydicarbonates, such as diisopropyl peroxydicarbonate. The lower dialkyl peroxydicarbonates, e.g., $C_2$ – $C_8$ dialkyl peroxydicarbonates, have been found most suitable for use as initiators at the polymerization temperatures conventionally used, i.e., between 45°C. and 80°C., e.g., 45°C. – 55°C.

The lower dialkyl peroxydicarbonates, e.g., diethyl peroxydicarbonate and diisopropyl peroxydicarbonate, are, when pure, more unstable than the higher dialkyl peroxydicarbonates, some of which are solids. Therefore, the preparation, transportation, storage and use in commercial polymerization facilities of the lower dialkyl peroxydicarbonates requires special precautions and handling procedures. For example, such initiators are usually shipped and stored under refrigeration. The aforesaid special precautions and handling procedures may have inhibited some from taking full advantage of the benefits offered by their use.

It has been suggested that the lower dialkyl peroxydicarbonates, such as diethyl peroxydicarbonate, be produced in situ in a polymerization medium containing an aqueous phase and a monomer phase by the reaction of an alkyl haloformate and hydrogen peroxide. See, for example, U.S. Pat. Nos. 3,022,281 and 3,575,945. In the former, it is suggested that the alkyl haloformate be present in the monomer phase and the hydrogen peroxide be present in the alkaline water phase, thereby forming dialkyl peroxydicarbonate at the interface of the two phases. The aforementioned process for preparing dialkyl peroxydicarbonate in situ suffers from several disadvantages. First, the alkyl haloformate, e.g., ethyl chloroformate, is a lachrymator. Further, the use of the alkyl haloformate results in the formation of a hydrogen halide by-product which can be corrosive to the equipment used in the polymerization. Finally, the combined presence of the hydrogen halide and alkaline reagent, e.g., sodium hydroxide or sodium bicarbonate, results in the formation of a halide salt, e.g., sodium chloride, which may be present in the polymer product and, which when present even at low levels, must be removed by extensive washing of the polymer.

It has now been discovered that ethylenically unsaturated materials susceptible to polymerization with free-radical type initiators, e.g., vinyl chloride, can be polymerized with an initiating system comprising, in combination, alkaline reagent, hydrogen peroxide, and dialkyl pyrocarbonate. It is believed that the aforementioned initiating system generates dialkyl peroxydicarbonate as the initiator. The pyrocarbonate is not a lachrymator. Indeed, the lower alkyl pyrocarbonates, e.g., diethyl pyrocarbonate, have sweet, ester-like odor. By-products from the use of dialkyl pyrocarbonates are carbon dioxide, or sodium bicarbonate (a salt that can be used as an alkaline buffering reagent in the polymerization recipe) and an alkanol. The present invention, therefore, provides a novel means for preparing dialkyl peroxydicarbonates in situ in the polymerization medium without the disadvantages previously described for the initiator system described in U.S. Pat. No. 3,022,281.

DETAILED DESCRIPTION

Dialkyl pyrocarbonates useful in the practice of the present process can be represented by the general formula, $$R_1-O-\overset{\overset{O}{\|}}{C}-O-\overset{\overset{O}{\|}}{C}-O-R_2 \qquad \text{I.}$$

wherein $R_1$ and $R_2$ are each selected from the group consisting of $C_1$ – $C_{20}$ alkyl and alkenyl, $C_6$ – $C_{12}$ cycloalkyl, $C_7$ – $C_{10}$ aralkyl having a single aromatic ring, and $C_6$ – $C_8$ aryl groups. Preferably, $R_1$ and $R_2$ are each selected from the group consisting of $C_1$ – $C_{12}$ alkyl, $C_6$ – $C_{10}$ cycloalkyl, phenyl and benzyl groups. More preferably, $R_1$ and $R_2$ are the same and are $C_1$ – $C_8$ alkyl radicals. The aforementioned alkyl and aryl groups can be branched or straight chain and the alkyl, aryl and cycloalkyl groups can contain substituents that do not adversely effect the polymerization reaction or the polymer product, e.g., alkoxy, hydroxyl, cyano, etc. groups.

Suitable examples of dialkyl pyrocarbonates useful in the present process include: dimethyl pyrocarbonate, diethyl pyrocarbonate, diisopropyl pyrocarbonate, di-n-propyl pyrocarbonate, di-n-butyl pyrocarbonate, diisobutyl pyrocarbonate, di-secondarybutyl pyrocarbonate, di-tertiarybutyl pyrocarbonate, dicyclohexyl pyrocarbonate, di-2-ethylhexyl pyrocarbonate and di-4-tertiarybutylcyclohexyl pyrocarbonate. Economically preferred are dimethyl, diethyl, di-n-propyl, diisopropyl, and the dibutyl pyrocarbonates.

The dialkyl pyrocarbonates can be prepared by reacting alkali metal alkylcarbonate, e.g., sodium ethylcarbonate, and alkyl halocarbonate, e.g., ethylchlorocarbonate (ethylchloroformate). The alkyl groups of the alkylcarbonate and halocarbonate are chosen to correspond to the alkyl groups desired for the pyrocarbonate. For example, sodium ethoxide, which can be prepared by dissolving sodium metal in a toluene solution of ethyl alcohol is carbonated with carbon dioxide to prepare sodium ethyl carbonate. Thereafter, the sodium ethyl carbonate is reacted with ethyl chloroformate to form diethyl pyrocarbonate and sodium chloride. The chloride salt is filtered and the pyrocarbonate recovered by distillation. The aforementioned latter reaction can be characterized by the following balanced equation:

$$C_2H_5-O-\overset{\overset{O}{\|}}{C}-ONa + C_2H_5-O-\overset{\overset{O}{\|}}{C}-Cl \longrightarrow C_2H_5-O-\overset{\overset{O}{\|}}{C}-O-\overset{\overset{O}{\|}}{C}-O-C_2H_5 + NaCl \qquad \text{II.}$$

Dialkyl pyrocarbonates can be prepared also by reacting alkyl halocarbonate, e.g., ethyl chloroformate, with sodium hydroxide in the presence of a catalyst of a tertiary amine or quaternization product thereof having at least one ω-hydroxyalkyl, ω-hydroxyalkyl ether or ω-hydroxyalkyl polyether group connected to the nitrogen atom. See, for example, Example 6 of U.S. Pat. No. 3,326,958. In that example, ethylchloroformate and methylene chloride containing a catalytic amount of the reaction product of 8 moles of ethylene oxide with 1 mole of n-methyl-stearylamine were mixed. Sodium hydroxide is added dropwise to the mixture with stirring and cooling to 18°–22°C. The methylene chloride layer is separated, dried and distilled. After removing the methylene chloride, the residue is distilled under vacuum. Diethyl pyrocarbonate distills over at a boiling point of 83°–84°C. at 11 mm. of mercury. The aforementioned reaction can be represented by the following equation:

$$2\ C_2H_5-O-\overset{O}{\overset{\|}{C}}-Cl + 2NaOH \xrightarrow[Cat.]{CH_2Cl_2} C_2H_5-O-\overset{O}{\overset{\|}{C}}-O-\overset{O}{\overset{\|}{C}}-O-C_2H_5 + 2\ NaCl + H_2O \qquad \text{III.}$$

The preparative method hereinabove first described, namely the use of an alkali metal alkylcarbonate and an alkyl halocarbonate, offers the potential for preparing mixed dialkyl pyrocarbonates, i.e., a pyrocarbonate in which the alkyl group at each end of the molecule are different. See, for example, page 34 of the article, "Synthesen Mit Pyrokoklensaureestern", by W. Thoma and H. Rinke, Annalen der Chemie, 624 (1959). Some examples of mixed pyrocarbonates include: methyl ethyl pyrocarbonate, ethyl β-chloroethyl pyrocarbonate, ethyl allyl pyrocarbonate, ethyl β-methoxyethyl pyrocarbonate, ethyl phenyl pyrocarbonate, ethyl benzyl pyrocarbonate, ethyl cyclohexyl pyrocarbonate, ethyl 2,4-dichlorophenyl pyrocarbonate, ethyl 3,4-dichlorobenzyl pyrocarbonate, ethyl n-propyl pyrocarbonate, ethyl isopropyl pyrocarbonate, ethyl sec-butyl pyrocarbonate, ethyl 2-ethylhexyl pyrocarbonate, and methyl n-propyl pyrocarbonate.

In combination with the aforementioned dialkyl pyrocarbonate, there is used, in accordance with the present process, hydrogen peroxide. Any source of hydrogen peroxide can be used, i.e., an inorganic peroxygen compound which, when dissolved in the polymerization medium provides hydrogen peroxide. Thus, sodium peroxide which provides hydrogen peroxide and sodium hydroxide when dissolved in water, can be used. Hydrogen peroxide is, of course, commercially available in several strengths. It can be prepared commercially by the alternate catalytic reduction-oxidation of an anthraquinone, e.g., 2-ethyl-anthraquinone. Strengths at which hydrogen peroxide is commercially available include: 3 percent, 6 percent, 27.5 percent, 30 percent, 35 percent, 50 percent, 70 percent and 90 percent. Preferably, the moderately concentrated grades, e.g., 27.5 percent – 50 percent, are used since such grades do not introduce as much water to the system as the less concentrated grades and are safer to handle than the more concentrated grades. As used herein, the term "hydrogen peroxide" is intended to mean and include a source of hydrogen peroxide, i.e., hydrogen peroxide or an inorganic peroxide, the decomposition of which yields hydrogen peroxide, e.g., sodium peroxide.

In addition to the dialkyl pyrocarbonate and hydrogen peroxide, an alkaline buffering reagent is used as part of the initiator recipe system. The alkaline reagent can be present already in the polymerization medium or added separately with the other initiator system components. It has been found that the presence of an alkaline buffering reagent enhances the interaction of the dialkyl pyrocarbonate with hydrogen peroxide. The alkaline buffering reagent should be soluble in the polymerization medium and/or the phase wherein the pyrocarbonate and hydrogen peroxide react. Suitable alkaline reagents that can be used include soluble organic and inorganic alkali metal and alkaline earth metal reagents that produce an alkaline response in the polymerization medium or provide a buffering effect in such medium, such as the carbonates and bicarbonates of such metals. Specific examples of such reagents include: sodium potassium, and calcium carbonates and bicarbonates; lithium, sodium and potassium hydroxides, acetates, borates, e.g., borax, tartrates, citrates, and phosphates, e.g., trisodium phosphate and sodium pyrophosphate; ammonium hydroxide, and organic bases, e.g., the Triton surfactants.

Organic bases that can be used as the alkaline buffering reagent are those organic compounds that are soluble in the polymerization medium and that can abstract a hydrogen atom (proton) from hydrogen peroxide. Examples of such compounds include: pyridine, triethylamine, triethylenediamine and quaternary ammonium hydroxides, such as, tetramethylammonium hydroxide, trimethyl-s-butyl ammonium hydroxide, trimethyl tetraethylammonium hydroxide, trimethyl cetylammonium hydroxide, dioctadecyl dimethylammonium hydroxide, octadecyl dimethyl benzyl ammonium hydroxide, and benzyl trimethylammonium hydroxide (Triton B). The quaternary ammonium hydroxides are preferred. These compounds dissociate in solution, e.g., aqueous solution, and have the same basic strength in water as sodium or potassium hydroxide.

Quaternary ammonium hydroxides can be represented by the general formula:

$$R_8-\overset{R_5}{\overset{|}{\underset{R_7}{\underset{|}{N^+}}}}-R_6 + OH^- \qquad \text{IV.}$$

wherein $R_5$, $R_6$, $R_7$ and $R_8$ are each selected from the group consisting of $C_1$–$C_{20}$ alkyl, and $C_7$–$C_{20}$ aralkyl. Preferably, at least two of the organic substituents are alkyl radicals and more preferably lower alkyl ($C_1$–$C_4$) substituents. The aforementioned compounds, more commonly written $(R)_4N^+OH^-$ can be prepared by shaking the corresponding quaternary ammonium halide or acid sulfate with silver hydroxide or barium hydroxide respectively.

The amount of dialkyl pyrocarbonate used in the practice of the present process can vary widely and will depend on the monomer polymerized and the temperature at which the polymerization is conducted. Typically, however, from about 0.001 to about 3 weight percent of dialkyl pyrocarbonate, based on a total amount of monomer polymerized, is used. With respect to the polymerization of vinyl chloride, amounts of from about 0.01 to about 1 weight percent dialkyl pyrocarbonate are suitable.

The amount of hydrogen peroxide used in the practice of the present process will vary with the amount of dialkyl pyrocarbonate used. Generally, from about 0.1 to about 10.0 and, preferably, from about 0.2 to about 2.0 moles of hydrogen peroxide per mole of the dialkyl pyrocarbonate will be used; however, more than such amount can be used.

The amount of alkaline buffering reagent used is not critical and typically varies from 100 to 1000 weight percent, based on the amount of dialkyl pyrocarbonate used. The amount of alkaline reagent used for the initiator system is usually calculated separately from any amounts that may be used as part of the polymerization recipe. Expressed differently, suitable concentrations of alkaline buffering reagent can vary from about 0.01 percent to about 10 percent, preferably from about 0.5 percent to about 1.5 percent, by weight, of the monomer feed. The alkaline reagent can be used also to maintain the pH of the polymerization medium between 6 and 12, preferably between 8 and 9. Consequently, suitable buffering agents may be already present in the polymerization medium, depending on the polymerization recipe.

The dialkyl peroxydicarbonates which are believed to be generated in situ in the polymerization medium can be represented by the general formula, $$R_1-O-\overset{\overset{\displaystyle O}{\|}}{C}-O-O-\overset{\overset{\displaystyle O}{\|}}{C}-O-R_2 \qquad \text{V.}$$

wherein $R_1$ and $R_2$ are as defined above with respect to the dialkyl pyrocarbonates. Typical examples thereof include: dimethyl peroxydicarbonate, diethyl peroxydicarbonate, diisopropyl peroxydicarbonate, di-n-propyl peroxydicarbonate, di-n-butyl peroxydicarbonate, di-secondarybutyl peroxydicarbonate, di-2-ethylhexyl peroxydicarbonate, diphenyl peroxydicarbonate, dibenzyl peroxydicarbonate, dicyclohexyl peroxydicarbonate, di-4-tertiarybutyl cyclohexyl peroxydicarbonate, ethyl isopropyl peroxydicarbonate, methyl ethyl peroxydicarbonate, ethyl n-propyl peroxydicarbonate, ethyl secondary butyl peroxydicarbonate, ethyl 2-ethylhexyl peroxydicarbonate, etc.

The polymerization method described herein is applicable to the polymerization of ethylenically unsaturated materials, i.e., materials containing an ethylenic $$\left(-\overset{\overset{\displaystyle H}{|}}{C}=\overset{\overset{\displaystyle H}{|}}{C}-\right)$$

or vinyl ($CH_2{=}C<$) linkage, particularly a single $CH_2{=}CH$- group, that are susceptible to free-radical polymerization. Examples of such compounds include: aryl-substituted olefins, such as styrene, alpha-chlorostyrene and the like; acrylic and alpha-substituted acrylic acids, e.g., methacrylic acid, $C_1 - C_4$alkyl esters, nitriles and amides of such acids, such as acrylonitrile, alpha-methacrylonitrile, methyl acrylate, ethyl acrylate, methyl methacrylate, methacrylamide, acrylamide and the like; vinyl esters, ethers, ketone and heterocyclic halogen-containing vinyl and vinylidene compounds, such as vinyl chloride, vinylidene chloride, vinyl bromide, vinylidene bromide, vinyl acetate, vinyl propionate, vinyl butyrate, vinyl fluoride, vinylidene fluoride, 1,1-chlorofluoroethylene, tetrafluoroethylene, 1,1-difluoro-2,2-dichloroethylene, perfluoropropylene, 3,3,3-trifluoropropylene, 3,3,3-trichloropropylene, 2-chloropropylene and the like; and unsaturated polyesters, particularly water dispersible unsaturated polyesters having a high acid number.

Unsaturated polyesters are prepared typically by the reaction of dibasic acids or anhydrides and polyhydric alcohols, one of which is unsaturated. Generally, the acid or anhydride reactant is unsaturated. Common examples thereof include maleic acid, maleic anhydride, fumaric acid and itaconic acid. Often, saturated acids or anhydrides are used in addition to the unsaturated acid. Examples thereof include chlorendic acid and anhydride, succinic acid and anhydride, sebacic acid, o-phthalic acid and anhydride, isophthalic acid, terephthalic acid and adipic acid.

Polyhydric alcohols typically are dihydric but may contain three or more hydroxyls. Examples of saturated alcohols include ethylene glycol, propylene glycol, diethylene glycol, triethylene glycol, neopentyl glycol, tetraethylene glycol, butylene glycol, dipropylene glycol, glycerol, trimethylolethane, trimethylolpropane, pentaerythritol, sorbitol and others. Of the unsaturated alcohols, the most common is allyl alcohol.

The preparation of unsaturated polyesters is well known. See, for example, U.S. Pat. No. 3,390,135. By further reacting the unsaturated polyester with a vinyl-type monomer, such as vinyl acetate, styrene and methyl methacrylate, cross-linked, three-dimensional resins are formed. Copolymerizatin of the unsaturated polyester with the vinyl monomer to form polyester resins is free-radical initiated since the reaction is essentially a vinyl-type polymerization. The present process is applicable, therefore, to the preparation of such polyester resins. Thus, the present process provides a useful and safe source of free radicals for the polymer industry.

The present process is particularly applicable to the polymerization of vinyl chloride, as well as the copolymerization of mixtures of two or more of the aforementioned monomeric materials, e.g., the polymerization of vinyl chloride with other copolymerizable monomers, such as vinyl bromide, vinylidene chloride, vinyl acetate, methyl acrylate, methyl methacrylate and the like. When copolymerizing vinyl chloride with other monomer(s) copolymerizable therewith, vinyl chloride is used generally in amounts greater than 50 mole percent, e.g., from 75 to 95 mole percent of vinyl chloride and from 5 to 25 mole percent of one or more of the other unsaturated copolymerizable monomer(s). The type of polymer products contemplated herein include graft, random, alternating and block copolymers. The exact nature of the polymer product is more a function of the polymerization procedure than the particular initiator used.

The type of polymer produced by the polymerization or copolymerization of the aforementioned polymerizable materials, e.g., monomers such as vinyl chloride, depends to a large extent on the temperature at which the polymerization is conducted. For example, polyvinyl chloride having properties useful for major commercial applications of that polymer are prepared typically at polymerization temperatures in the range of 40°–65°C.

The present process of generating dialkyl peroxydicarbonate initiators in situ in a polymerization system, especially initiating amounts of dialkyl peroxydicarbonate, is applicable particularly to both aqueous emulsion and suspension polymerizations, i.e., polymerizations conducted in an aqueous medium, as well as bulk polymerizations wherein no solvent or aqueous medium (water) is used. Bulk polymerization is the polymerization of pure monomer(s) during which the only additives present are such aids to polymerization as initiators, chain regulators, activators, etc. The present process is also considered to be utilizable for solution polymerizations wherein the polymerization is carried out in the presence of a solvent. In the case of bulk polymerizations, a soluble organic base is used as the alkaline buffering reagent. For purposes of brevity, both types of aqueous polymerizations will be referred to collectively as a suspension polymerization. By initiating amount is meant those amounts of compounds or initiators used individually or collectively that is sufficient to cause polymerization of the polymerizable monomer, i.e., sufficient to form polymer molecules from the particular monomer(s) used.

The practice of the present process is especially useful in the polymerization of monomeric materials heretofore described in an aqueous medium. In a typical suspension polymerization, the polymerization vessel is filled with water to which is added suspending agents, chain terminators, dialkyl pyrocarbonate, hydrogen peroxide and alkaline buffering agent. The polymerizable monomer is then charged to the vessel and the vessel closed.

The amount of water used, which is typically demineralized water, is large, based on the amount of monomeric material charged to the vessel. Dilution ratios of 2:1 to 40:1, usually 3:1 to about 20:1, are common. At such dilution ratios, it is surprising to find that the dialkyl pyrocarbonate or hydrogen peroxide, in the typical amounts used to produce initiating amounts of initiator, appear to react with one another to generate, in situ, what, from the evidence at hand, is believed to be a dialkyl peroxydicarbonate. This is especially surprising since the dialkyl pyrocarbonate also hydrolyzes in water. It, therefore, might have been assumed that with the above dilutions, the competing hydrolysis reactions of the dialkyl pyrocarbonate would proceed at such a rate that little, if any, dialkyl peroxydicarbonate would be formed, much less, the amount needed to initiate and sustain a polymerization reaction.

The temperature at which polymerization of the abovedescribed monomeric materials is conducted can, of course, vary over a wide range. The particular temperatures used will depend on the particular material polymerized and the properties of the polymer desired since the polymerization temperature affects the properties of the polymer. Generally, such polymerizations are conducted at temperatures of from about 0°C. to about 95°C. With particular reference to the polymerization of vinyl chloride and the copolymerization of vinyl chloride with other copolymerizable monomers, e.g., vinyl acetate or vinylidene chloride, polymerization temperatures typically range from about 20°C. to about 70°C., e.g., 40°C. to 65°C.

In conducting the polymerization of the monomeric materials, as described above, the amount of dialkyl pyrocarbonate and hydrogen peroxide introduced into the polymerization vessel is selected so as to produce or generate an initiating amount of dialkyl peroxydicarbonate. In view of the competing hydrolysis reaction, it is believed that not all of the pyrocarbonate introduced combines with hydrogen peroxide. The dialkyl peroxydicarbonate is believed to be formed by reaction of two (2) moles of the dialkyl pyrocarbonate and one (1) mole of hydrogen peroxide in accordance with the following balanced theoretical equation, $$2\text{—R—O—}\overset{\displaystyle O}{\overset{\|}{C}}\text{—O—}\overset{\displaystyle O}{\overset{\|}{C}}\text{—O—R} + \text{HOOH} \xrightarrow{\text{alk.}} \text{R—O—}\overset{\displaystyle O}{\overset{\|}{C}}\text{—O—O—}\overset{\displaystyle O}{\overset{\|}{C}}\text{—O—R} + 2\text{—R—O—}\overset{\displaystyle O}{\overset{\|}{C}}\text{—OH} \qquad \text{VI.}$$

The by-product, $$\text{R—O—}\overset{\displaystyle O}{\overset{\|}{C}}\text{—OH},$$

breaks down into carbon dioxide ($CO_2$) and an alkanol R—OH. The theoretical amount of dialkyl peroxydicarbonate used in the polymerization process (based on the equation VI) typically varies from about 0.001 to about 1.0 weight percent, preferably from about 0.01 to about 0.05 weight percent, based on the total amount of monomer or monomeric material(s) used. More generally, the amount of dialkyl peroxydicarbonate which is required to initiate the polymerization reaction is commonly referred to as an initiating amount.

In conducting the process of the present invention, dialkyl pyrocarbonate and hydrogen peroxide are introduced simultaneously or in any sequential order into the polymerization vessel, i.e., into the medium e.g., aqueous medium, in which the polymerization is conducted. Preferably, the aforementioned compounds are introduced separately, however, they may be mixed momentarily before introduction for convenience, e.g., charging to the vessel through one inlet port. Premixing, such as at room temperature or above, may likely result in some prereaction and loss of potentially available free radicals in the polymerization medium. Typically, the pyrocarbonate and hydrogen peroxide are introduced separately, but simultaneously into the polymerization vessel. More than one dialkyl pyrocarbonate can be used if desired in order to provide more than one type of dialkyl peroxydicarbonate in the polymerization medium. The manner of addition of the pyrocarbonate or hydrogen peroxide to the polymerization medium is not critical to the practice of the present process. Thus, the initiator reactant components can be introduced all at once or metered in continuously or intermittently, diluted with a suitable solvent or diluent, or in undiluted form. By suitable solvent or diluent is meant any material that does not affect the stability of the pyrocarbonate or hydrogen peroxide, or deleteriously affect the polymerization of the monomer being polymerized or the properties of the polymer product. While reference is made to polymerization vessels, etc. it is not intended that the use of the present initiator system be limited thereto. Thus, the system can be used in any container wherein initiators are required, e.g., molds, lay-ups, etc.

As mentioned, much of the commercial polymerizations of the above-described monomers occur in an aqueous polymerization medium to which has been added an emulsifying or suspending agent. Such agents aid in suspending or dispersing the polymer particles in the aqueous medium as they are formed, i.e., to form a latex or slurry-type effluent, usually having 35 percent or more dispersed solids, that is discharged from the polymerization vessel.

The particular suspending agent used in the practice of the present process is not critical. Such materials can be non-ionic, cationic, or anionic, as well as mixtures thereof. Examples of anionic agents are the sodium salts of sulfated or sulfonated hydrocarbons and fatty acids, such as dioctyl sodium sulfosuccinate, sodium dodecylbenzenesulfonate, sodium decylbenzenesulfonate, ammonium laurylbenzenesulfonate, potassium stearylbenzenesulfonate, potassium myristynaphthalenesulfonate, potassium oleate, ammonium laurate, sodium laurate, sulfonated diesel oil, and sodium lauryl sulfate (Duponol ME), sodium alkylnaphthalenesulfonate (Ketal BX-78), sodium salt of sulfated alkylphenoxypolyoxyethylene (Alipol CO-433), ammonium dodecylphenoxypolyoxyethylene ethyl sulfate, nonylphenoxy acetic acid, sulfated cresylic acid, disodium-N-octadecylsulfosuccinamate, tetrasodium N-(1,2-dicarboxyethyl)-N-octadecylsulfosuccinamate, diamyl ester of sodium sulfosuccinic acid, dihexyl ester of sodium sulfosuccinic acid, bis (tridecyl) ester of sodium sulfosuccinic acid, dioctyl sodium sulfosuccinate, sodium dodecyl diphenyl oxide disulfonate, benzene potassium sulfonate, sodium salt of a sulfonated naththaleneformaldehyde condensate, sodium salt of polyethoxy alkyl phenol sulfonate, sodium oleyl methyl tartrate, and triethanolamine salt of polyethoxy alkyl phenol sulfonate, and complex organic phosphates (Gafac RE-610). Examples of cationic agents are quaternary ammonium compounds, such as stearamidopropyl dimethyl-beta-hydroxyethyl ammonium nitrate, cetyl pyridinium chloride, and cetyl trimethylammonium bromide.

Examples of non-ionic agents are high molecular weight polymers of propylene oxide and ethylene oxide, nonylphenoxypoly (ethyleneoxy)ethanols (Igepal CO-630 and CO-880), polyoxyethylated fatty alcohol (Emulphor ON-870), alkyl aryl polyether alcohols such as lauryl phenyl polyether ethanol, alkanolamine fatty condensates such as triethanolamine coconut fatty acid ethanolamide, lauric acid propanolamide, fatty alcohol polyglycol ether, myristyl phenol polyglycol ether, polyoxyethylene monooleate, polyoxyethylene sorbitol septaoleate, polyoxyethylene sorbitol monolaurate, polyoxyethylene cetyl alcohol, polyoxyethylene stearate, glycolamido stearate, and other polyoxyethylene alkanols and alkyl phenols containing from 2 to 40 moles of ethylene oxide per mole of alkanol or alkyl phenol.

Anionic suspending agents are preferred since they are more efficient in stabilizing the resultant polymer latex. Of these, some will be found being more useful than others, depending on the process conditions, and the most suitable may be found by simple experimentation. Other suspending agents that can be used in the practice of the present process are protective colloids, such as gelatin, methyl cellulose, gum tragacanth and completely or partially hydrolyzed polyvinyl acetates. Other agents include hydroxylated phosphatides of soybean oil complex (Hydroxy Lecithin).

The amount of suspending agent used typically varies from 0.3 to 5 percent, based on the weight of the polymerizable monomers, although greater or lesser amounts can be used in some circumstances since the efficiencies of individual agents vary. The suspension of the monomer in the aqueous medium can be formed by any suitable means, such as by stirring or agitating the monomer, water, and suspending agent together in a vessel.

The present process is more particularly described in the following examples which are intended as illustrative only since numerous modifications and variations therein will be apparent to those skilled in the art.

EXAMPLE I

A standard twenty-eight (28) fluid ounce polymerization bottle was filled with three hundred grams of demineralized and distilled water, 0.5 grams of sodium bicarbonate and 0.15 grams of Lytron 886 suspending agent (a partial calcium salt of a carboxyl containing high molecular weight copolymer of styrene and maleic anhydride available from the Monsanto Company). The contents of the bottle was frozen and thereafter, 100 grams of liquid vinyl chloride, 0.53 grams of a 3 weight percent hydrogen peroxide solution and 0.16 grams of diethyl pyrocarbonate were charged to the bottle. The bottle was capped and placed in a constant temperature bath maintained at 50°C. wherein it was tumbled to agitate the contents. At the end of seventeen hours, the contents of the polymerization bottle was analyzed for percent conversion of vinyl chloride monomer to polyvinyl chloride. 138 grams of polymer were recovered, which amounted to 92 percent conversion.

EXAMPLE II

Run A

The procedure of Example I was repeated except that the ethyl pyrocarbonate was eliminated from the polymerization recipe. After 17.5 hours, no polymer was found.

Run B

The procedure of Example I was repeated except that the hydrogen peroxide was eliminated from the polymerization recipe. After 17 hours, no polymer was found.

Run C

The procedure of Example I was repeated except that 0.12 grams of diethyl carbonate was substituted for the 0.16 grams of diethyl pyrocarbonate in the polymerization recipe. After 17 hours, no polymer was observed.

Run D

The procedure of Example I was repeated except that the sodium bicarbonate was eliminated from the polymerization recipe. After 17 hours, no polymer was observed.

EXAMPLE III

The procedure of Example I was repeated except that 0.089 grams of preformed diethyl peroxydicarbonate was substituted for the sodium bicarbonate, hydrogen peroxide, and diethyl pyrocarbonate initiator system in the polymerization recipe. After 17 hours of polymerization, 92 percent conversion of monomer was found.

EXAMPLE IV

The procedure of Example I was repeated except that 0.03 grams of diisopropyl peroxydicarbonate was substituted for the sodium bicarbonate, hydrogen peroxide, and diethyl pyrocarbonate initiator system. After 17 hours of polymerization, 92.6 percent of the monomer was converted to polymer.

The results of Examples I-IV illustrate the utility of polymerizing ethylenically unsaturated materials, e.g., vinyl chloride, by formation of dialkyl peroxydicarbonates, e.g., diethyl peroxydicarbonate, in situ by the combined use of a dialkyl pyrocarbonate, e.g., diethyl pyrocarbonate, hydrogen peroxide, and an alkaline reagent. The data further illustrates that essentially the same percent conversion of monomer to polymer can be obtained utilizing the initiator system of the present invention as compared to the use of preformed dialkyl peroxydicarbonates.

Although the present process has been described with reference to specific details of certain embodiments thereof, it is not intended that such details should be regarded as limitations upon the scope of the invention except as and to the extent that they are included in the accompanying claims.

I claim:

1. In the process for polymerizing ethylenically unsaturated material susceptible to polymerization with free-radical type initiator, the improvement which comprises conducting said polymerization in the presence of an initiator system comprising, in combination alkaline reagent, hydrogen peroxide, and dialkyl pyrocarbonate representable by the general formula, $$R_1-O-\overset{\overset{O}{\|}}{C}-O-\overset{\overset{O}{\|}}{C}-O-R_2$$

wherein $R_1$ and $R_2$ are each selected from the group consisting of $C_1 - C_{20}$ alkyl and alkenyl, $C_6 - C_{12}$ cycloalkyl, $C_7 - C_{10}$ aralkyl having a single aromatic ring, and $C_6 - C_8$ aryl, said pyrocarbonate and hydrogen peroxide being present in the polymerization medium in amounts sufficient to generate an initiating amount of initiator and thereby polymerize the ethylenically unsaturated material.

2. The process of claim 1 wherein $R_1$ and $R_2$ are the same.

3. The process of claim 2 wherein $R_1$ and $R_2$ are each selected from the group consisting of $C_1 - C_{12}$ alkyl, $C_6 - C_{10}$ cycloalkyl, phenyl and benzyl.

4. The process of claim 1 wherein $R_1$ and $R_2$ are each $C_1 - C_8$ alkyl.

5. The process of claim 1 wherein from about 0.001 to about 3 weight percent of dialkyl pyrocarbonate, based on ethylenically unsaturated material, is used and the mole ratio of hydrogen peroxide to dialkyl pyrocarbonate, is from about 0.1:1 to about 10.0:1.

6. The process of claim 1 wherein the ethylenically unsaturated material is vinyl chloride.

7. The process of claim 1 wherein the dialkyl pyrocarbonate is diethyl pyrocarbonate.

8. The process of claim 1 wherein the alkaline reagent is selected from the group consisting of alkali metal and alkaline earth metal carbonates and bicarbonates, and quaternary ammonium hydroxides.

9. The process of claim 1 wherein the polymerization is conducted in an aqueous medium.

10. The process of claim 1 wherein the polymerization temperature is from 0°C. to 95°C.

11. In the process for polymerizing ethylenically unsaturated material susceptible to polymerizatin with free-radical type initiator in an aqueous or bulk polymerization medium, the improvement which comprises conducting said polymerization at between about 20°C. and about 70°C. in the presence of an initiator system comprising, in combination, alkaline reagent, hydrogen peroxide, and dialkyl pyrocarbonate representable by the general formula, $$R_1-O-\overset{\overset{O}{\|}}{C}-O-\overset{\overset{O}{\|}}{C}-O-R_2$$

wherein $R_1$ and $R_2$ are each selected from the group consisting of $C_1 - C_{12}$ alkyl, $C_6 - C_{10}$ cycloalkyl, phenyl and benzyl, said pyrocarbonate and hydrogen peroxide being present in the polymerization medium in amounts sufficient to generate an initiating amount of initiator and thereby polymerize the ethylenically unsaturated material.

12. The process of claim 11 wherein from about 0.01 to about 1 weight percent of dialkyl pyrocarbonate, based on ethylenically unsaturated material, is used and the mole ratio of hydrogen peroxide to dialkyl pyrocarbonate is from about 0.1:1 to about 10.0:1.

13. The process of claim 12 wherein the alkaline reagent is selected from the group consisting of alkali metal and alkaline earth metal carbonates and bicarbonates and quaternary ammonium hydroxides and the amount of alkaline reagent is between about 0.01 and about 10 weight percent, based on the ethylenically unsaturated material.

14. The process of claim 12 wherein the ethylenically unsaturated material is vinyl chloride.

15. The process of claim 12 wherein $R_1$ and $R_2$ are the same and are methyl, ethyl, n-propyl, isopropyl or butyl radicals.

16. The process of claim 14 wherein the polymerization is conducted in an aqueous medium.

17. The process of claim 16 wherein $R_1$ and $R_2$ are each $C_1 - C_8$ alkyl.

18. The process of claim 17 wherein $R_1$ and $R_2$ are the same and are methyl, ethyl, n-propyl, isopropyl or butyl radicals and the alkaline reagent is sodium bicarbonate or quaternary ammonium hydroxide.

19. The process of claim 1 wherein the polymerization is conducted in an aqueous or bulk polymerization medium.

* * * * *